United States Patent
Liu

(10) Patent No.: US 12,128,502 B2
(45) Date of Patent: Oct. 29, 2024

(54) CONTROL METHOD OF LASER PROCESSING, LASER PROCESSING APPARATUS, AND NON-TRANSITORY COMPUTER READABLE STORAGE MEDIUM

(71) Applicant: Makeblock Co., Ltd., Guangdong (CN)

(72) Inventor: Yuchao Liu, Guangdong (CN)

(73) Assignee: MAKEBLOCK CO., LTD., Shenzhen (CN)

(*) Notice: Subject to any disclaimer, the term of this patent is extended or adjusted under 35 U.S.C. 154(b) by 838 days.

(21) Appl. No.: 17/236,897

(22) Filed: Apr. 21, 2021

(65) Prior Publication Data
US 2021/0237205 A1 Aug. 5, 2021

Related U.S. Application Data

(63) Continuation of application No. PCT/CN2019/096676, filed on Jul. 19, 2019.

(30) Foreign Application Priority Data

Jan. 16, 2019 (CN) .......................... 201910041646.7

(51) Int. Cl.
*B23K 26/36* (2014.01)
*B23K 26/362* (2014.01)

(52) U.S. Cl.
CPC ................................ *B23K 26/362* (2013.01)

(58) Field of Classification Search
None
See application file for complete search history.

(56) References Cited

U.S. PATENT DOCUMENTS

2007/0099699 A1 5/2007 Plotkin
2018/0150058 A1 5/2018 Shapiro
2021/0237205 A1* 8/2021 Liu ...................... B23K 26/362

FOREIGN PATENT DOCUMENTS

| CN | 101112735 A | 1/2008 |
|----|-------------|--------|
| CN | 101209641 A | 7/2008 |
| CN | 102229025 A | 11/2011 |
| CN | 104249217 A | 12/2014 |

(Continued)

OTHER PUBLICATIONS

International Search Report issued in corresponding International Application No. PCT/CN2019/096676, mailed Oct. 22, 2019.

(Continued)

*Primary Examiner* — Geoffrey S Evans
(74) *Attorney, Agent, or Firm* — HAUPTMAN HAM, LLP

(57) ABSTRACT

A control method of laser processing, a laser processing apparatus, and non-transitory computer readable storage medium are provided. The control method of laser processing includes the following. An image of a to-be-processed material is captured via a camera mounted on a laser processing apparatus, where the captured image is used for depicting the to-be-processed material and lines drawn on the to-be-processed material. Processing lines of the to-be-processed material are identified according to the drawn lines in the captured image. Laser processing is performed on the to-be-processed material according to the processing lines, to obtain a laser product corresponding to the drawn lines.

17 Claims, 4 Drawing Sheets

(56) References Cited

FOREIGN PATENT DOCUMENTS

| | | | |
|---|---|---|---|
| CN | 106077971 | A | 11/2016 |
| CN | 108515262 | A | 9/2018 |
| CN | 109048072 | A | 12/2018 |
| CN | 109128518 | A | 1/2019 |
| JP | 2003080524 | A | 3/2003 |
| JP | 2017152564 | A | 8/2017 |

OTHER PUBLICATIONS

First Search issued in corresponding Chinese Application No. 201910041646.7, dated Jan. 16, 2019.
The Extended European Search Report issued in corresponding EP Application No. EP19910656.8, mailed May 9, 2022.

* cited by examiner

CONTROL METHOD OF LASER PROCESSING, LASER PROCESSING APPARATUS, AND NON-TRANSITORY COMPUTER READABLE STORAGE MEDIUM

CROSS-REFERENCE TO RELATED APPLICATION(S)

This application is a continuation of International Application No. PCT/CN2019/096676, filed on Jul. 19, 2019, which claims priority to Chinese Patent Application No. 201910041646.7, filed on Jan. 16, 2019, the entire disclosures of which are hereby incorporated by reference in their entireties.

TECHNICAL FIELD

This disclosure relates to the technical field of material processing, and more particularly to a control method of laser processing, a laser processing apparatus, and a non-transitory computer readable storage medium.

BACKGROUND

Currently, material processing apparatuses including a laser processing apparatus are not only used in industrial processing, but also in Do It Yourself (DIY) production. The laser processing apparatus has high processing accuracy and efficiency, and can adapt to materials of different hardness and process the materials from different angles, which has been widely used in DIY production.

The existing laser processing apparatus performs laser processing according to processing images imported into a system of the laser processing apparatus, where the processing images are made and imported into the laser processing apparatus in response to user's input.

During DIY production with the existing laser processing apparatus, the user generally need to perform the following operations: draw lines on the paper; scan the lines into an electronic document through a scanning device; set a laser processing manner corresponding to each line through a Photoshop (PS) software on the computer to obtain the processing image. Thereafter, the processing image is imported into the laser processing apparatus, such that the laser processing apparatus can perform laser processing according to the processing image.

The inventor realizes that the existing method for processing control of the laser processing apparatus involves various manual operations. That is, to enable the laser processing apparatus to successfully process the objects to be processed, the user needs to complete various kinds of work and perform various operations.

SUMMARY

To solve the technical problems that more manual operations are required in the related art, implementations of the disclosure provides a control method and device of laser processing, a laser processing apparatus, and a computer readable storage medium.

A control method of laser processing is provided. The control method of laser processing includes the following. An image of a to-be-processed material is captured via a camera mounted on a laser processing apparatus, where the captured image is used for depicting the to-be-processed material and lines drawn on the to-be-processed material. Processing lines of the to-be-processed material are identified according to the drawn lines in the captured image. Laser processing is performed on the to-be-processed material according to the processing lines, to obtain a laser product corresponding to the drawn lines.

In at least one implementation, the lines are drawn on the to-be-processed material according to a laser processing manner planned for the to-be-processed material. The image of the to-be-processed material is captured via the camera mounted on the laser processing apparatus as follows. The camera is controlled to perform image capturing against the to-be-processed material, to obtain the image of the to-be-processed material that contains the drawn lines.

In at least one implementation, the processing lines of the to-be-processed material are identified according to the drawn lines in the image as follows. At least one line feature is extracted from the drawn lines in the image. The processing lines corresponding to the lines drawn on the to-be-processed material are identified according to the at least one line feature, where the processing lines are indicative of laser processing on the drawn lines.

In at least one implementation, the at least one line feature includes a line color. The at least one line feature is extracted from the drawn lines in the image as follows. A color value of each of multiple pixel points corresponding to the drawn lines in the image is obtained, to obtain multiple color values. The line color is determined according to the multiple color values obtained.

In at least one implementation, the processing lines corresponding to the lines drawn on the to-be-processed material are identified according to the at least one line feature as follows. A laser processing manner corresponding to the line color is obtained, where the laser processing manner includes laser engraving or laser cutting. The processing lines corresponding to the lines drawn on the to-be-processed material are identified according to the laser processing manner corresponding to the lines drawn on the to-be-processed material.

In at least one implementation, the at least one line feature includes a line color. The processing lines corresponding to the lines drawn on the to-be-processed material are identified according to the at least one line feature as follows. A laser processing manner corresponding to the line color is obtained, where the laser processing manner includes laser engraving or laser cutting. The processing lines corresponding to the lines drawn on the to-be-processed material are identified according to the laser processing manner corresponding to the lines drawn on the to-be-processed material.

In at least one implementation, the at least one line feature is embodied as multiple line features. The processing lines corresponding to the lines on the to-be-processed material are identified according to the at least one line feature as follows. A priority of each of the multiple line features extracted from the drawn lines is obtained, to obtain multiple priorities. A weighted-comparison operation is performed on the multiple priorities, to determine a laser processing manner corresponding to the drawn lines, and the drawn lines are mapped to the processing lines corresponding to the laser processing manner.

A control device of laser processing is provided. The control device of laser processing includes an image obtaining module, an identifying module, and a processing module. The image obtaining module is configured to capture, via a camera mounted on a laser processing apparatus, an image of a to-be-processed material, where the captured image is used for depicting the to-be-processed material and lines drawn on the to-be-processed material. The identifying module is configured to identify, according to the drawn lines in the captured image, processing lines of the to-be-processed material. The processing module is configured to perform, according to the processing lines, laser processing on the to-be-processed material, to obtain a laser product corresponding to the drawn lines.

In one example, the lines are drawn on the to-be-processed material according to a laser processing manner planned for the to-be-processed material. The image obtaining module is configured to control the camera to perform image capturing against the to-be-processed material, to obtain the image of the to-be-processed material that contains the drawn lines.

In at least one implementation, the identifying module includes a feature extracting unit and a determining unit. The feature extracting unit is configured to extract at least one line feature from the drawn lines in the image. The determining unit is configured to identify, according to the at least one line feature, the processing lines corresponding to the lines drawn on the to-be-processed material, where the processing lines are indicative of laser processing on the drawn lines.

In one example, the at least one line feature includes a line color. The feature extracting unit is configured to obtain a color value of each of multiple pixel points corresponding to the drawn lines in the image, to obtain multiple color values, and determine the line color according to the multiple color values obtained.

In one example, the determining unit is configured to: obtain a laser processing manner corresponding to the line color, where the laser processing manner includes laser engraving or laser cutting; identify the processing lines corresponding to the lines drawn on the to-be-processed material according to the laser processing manner corresponding to the lines drawn on the to-be-processed material.

In one example, the at least one line feature is embodied as multiple line features. The determining unit is configured to: obtain a priority of each of the multiple line features extracted from the drawn lines, to obtain multiple priorities; perform a weighted-comparison operation on the multiple priorities to determine a laser processing manner corresponding to the drawn lines, and map the drawn lines to the processing lines corresponding to the laser processing manner.

A laser processing apparatus equipped with a camera is provided. The laser processing apparatus includes a processor and a memory storing computer readable instructions. The computer readable instructions, when executed by the processor, cause the processor to: capture, via a camera mounted on a laser processing apparatus, an image of a to-be-processed material, where the captured image is used for depicting the to-be-processed material and lines drawn on the to-be-processed material; identify, according to the drawn lines in the captured image, processing lines of the to-be-processed material; perform, according to the processing lines, laser processing on the to-be-processed material, to obtain a laser product corresponding to the drawn lines.

In at least one implementation, the lines are drawn on the to-be-processed material according to a laser processing manner planned for the to-be-processed material. The processor configured to capture, via the camera mounted on the laser processing apparatus, the image of the to-be-processed material is configured to: control the camera to perform image capturing against the to-be-processed material, to obtain the image of the to-be-processed material that contains the drawn lines.

In at least one implementation, the processor configured to identify, according to the drawn lines in the image, the processing lines of the to-be-processed material is configured to: extract at least one line feature from the drawn lines in the image; identify, according to the at least one line feature, the processing lines corresponding to the lines drawn on the to-be-processed material, where the processing lines are indicative of laser processing on the drawn lines.

In at least one implementation, the at least one line feature includes a line color, and the processor configured to extract the at least one line feature from the drawn lines in the image is configured to: obtain a color value of each of multiple pixel points corresponding to the drawn lines in the image, to obtain multiple color values; determine the line color according to the multiple color values obtained.

In at least one implementation, the processor configured to identify, according to the at least one line feature, the processing lines corresponding to the lines drawn on the to-be-processed material is configured to: obtain a laser processing manner corresponding to the line color, where the laser processing manner includes laser engraving or laser cutting; identify the processing lines corresponding to the lines drawn on the to-be-processed material according to the laser processing manner corresponding to the lines drawn on the to-be-processed material.

In at least one implementation, the at least one line feature includes a line color, and the processor configured to identify, according to the at least one line feature, the processing lines corresponding to the lines drawn on the to-be-processed material is configured to: obtain a laser processing manner corresponding to the line color, where the laser processing manner includes laser engraving or laser cutting; identify the processing lines corresponding to the lines drawn on the to-be-processed material according to the laser processing manner corresponding to the lines drawn on the to-be-processed material.

In at least one implementation, the at least one line feature is embodied as multiple line features, and the processor configured to identify, according to the at least one line feature, the processing lines corresponding to the lines drawn on the to-be-processed material is configured to: obtain a priority of each of the multiple line features extracted from the drawn lines, to obtain multiple priorities; perform a weighted-comparison operation on the multiple priorities to determine a laser processing manner corresponding to the drawn lines, and map the drawn lines to the processing lines corresponding to the laser processing manner.

A non-transitory computer readable storage medium is provided. The non-transitory computer readable storage medium storing computer programs which, when executed by a processor, cause the processor to: capture, via a camera mounted on a laser processing apparatus, an image of a to-be-processed material, where the captured image is used for depicting the to-be-processed material and lines drawn on the to-be-processed material; identify, according to the drawn lines in the captured image, processing lines of the to-be-processed material; perform, according to the processing lines, laser processing on the to-be-processed material, to obtain a laser product corresponding to the drawn lines.

In at least one implementation, the lines are drawn on the to-be-processed material according to a laser processing manner planned for the to-be-processed material. The computer programs executed by the processor to capture, via the camera mounted on the laser processing apparatus, the image of the to-be-processed material are executed by the processor to: control the camera to perform image capturing against the to-be-processed material, to obtain the image of the to-be-processed material that contains the drawn lines.

In at least one implementation, the computer programs executed by the processor to identify, according to the drawn lines in the image, the processing lines of the to-be-processed material are executed by the processor to: extract at least one line feature from the drawn lines in the image; identify, according to the at least one line feature, the processing lines corresponding to the lines drawn on the to-be-processed material, where the processing lines are indicative of laser processing on the drawn lines.

In at least one implementation, the at least one line feature includes a line color, and the computer programs executed by the processor to extract the at least one line feature from the drawn lines in the image are executed by the processor to: obtain a color value of each of multiple pixel points corresponding to the drawn lines in the image, to obtain multiple color values; determine the line color according to the multiple color values obtained.

In at least one implementation, the computer programs executed by the processor to identify, according to the at least one line feature, the processing lines corresponding to the lines drawn on the to-be-processed material are executed by the processor to: obtain a laser processing manner corresponding to the line color, where the laser processing manner includes laser engraving or laser cutting; identify the processing lines corresponding to the lines drawn on the to-be-processed material according to the laser processing manner corresponding to the lines drawn on the to-be-processed material.

In at least one implementation, the at least one line feature is embodied as multiple line features, and the computer programs executed by the processor to identify, according to the at least one line feature, the processing lines corresponding to the lines drawn on the to-be-processed material are executed by the processor to: obtain a priority of each of the multiple line features extracted from the drawn lines, to obtain multiple priorities; perform a weighted-comparison operation on the multiple priorities to determine a laser processing manner corresponding to the drawn lines, and map the drawn lines to the processing lines corresponding to the laser processing manner.

Implementations of the disclosure may have the following advantageous effects.

According to the method provided herein, the image of the to-be-processed material is captured via the camera mounted on the laser processing apparatus, the processing lines of the to-be-processed material are identified according to the drawn lines in the captured image. Laser processing is performed on the to-be-processed material according to the processing lines, to obtain the laser product corresponding to the drawn lines.

By implementing the method, the laser processing apparatus is controlled to directly process the to-be-processed material according to the lines drawn by the user on the surface of the to-be-processed material, which greatly reduces the manual operations required in the laser processing process, thereby solving the problem that various more manual operations are required in the related art. In the implementations, the user merely needs to draw lines on the to-be-processed object, put the to-be-processed object having the drawn lines into the laser processing apparatus, and trigger the laser processing apparatus to execute the above method, and therefore the laser product corresponding to the drawn lines can be obtained.

It should be understood that the above general description and following detailed description are merely exemplary and are not intended to limit the disclosure.

BRIEF DESCRIPTION OF THE DRAWINGS

The accompanying drawings herein are incorporated into the specification and constitute a part of the specification. The accompanying drawings illustrate some implementations of the disclosure, and together with the specification are intended to explain the principle of the disclosure.

DETAILED DESCRIPTION

The exemplary implementations will be described in detail herein, and the examples are illustrated in the accompanying drawings. When the following description refers to the accompanying drawings, unless otherwise indicated, the same numbers in different drawings indicate the same or similar elements. The implementations described in the following exemplary implementations do not represent all implementations of the disclosure. On the contrary, the following implementations merely some examples of devices and methods consistent with some aspects of the disclosure as detailed in the appended claims.

The disclosure is applied to the following scenarios: a user draws different lines on a surface of a to-be-processed material, and with aid of the method of the disclosure, a laser processing apparatus processes the to-be-processed material according to the lines drawn by the user.

Figure 1:
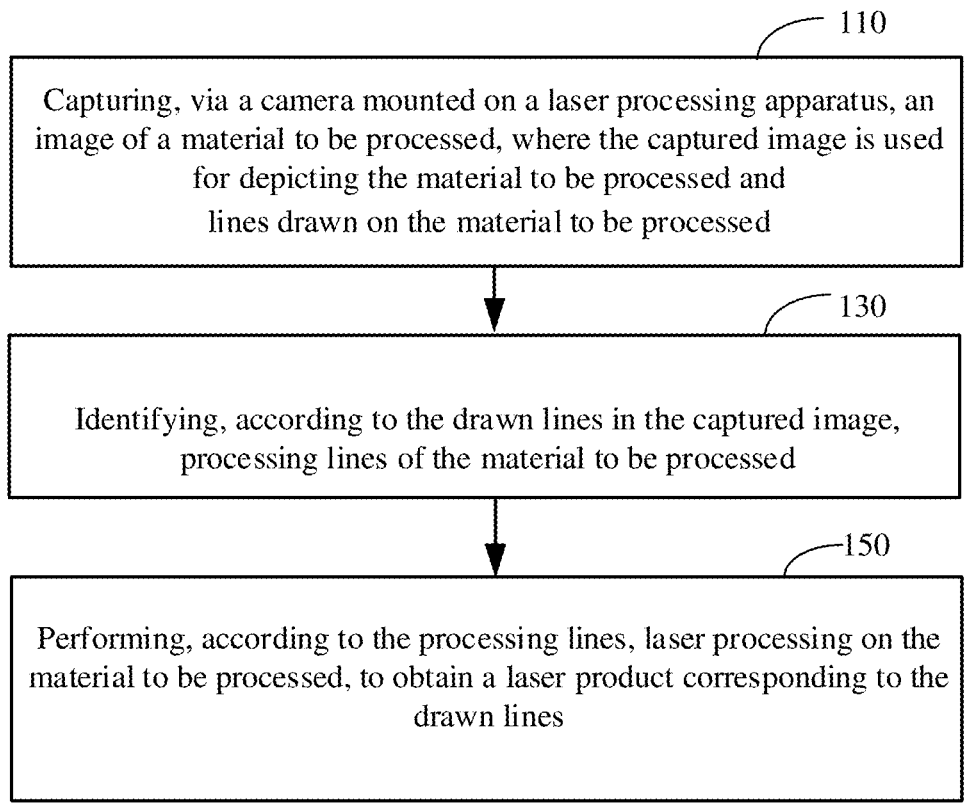
FIG. 1 is a flow chart illustrating a control method of laser processing according to implementations of the disclosure.

FIG. 1 is a flow chart illustrating a control method of laser processing according to implementations of the disclosure. The method is used for processing control of the laser processing apparatus. That is, the laser processing apparatus can recognize lines drawn on the to-be-processed material, and process the to-be-processed material according to the lines.

As illustrated in FIG. 1, the control method of laser processing begins at block 110.

At block 110, an image of a to-be-processed material is captured via a camera mounted on a laser processing apparatus, where the captured image is used for depicting the to-be-processed material and lines drawn on the to-be-processed material.

The laser processing apparatus is used for laser processing of objects. The laser processing apparatus referred to herein is equipped with the camera, where the camera is configured to capture the image of the to-be-processed material.

The to-be-processed material is an object (such as an acrylic cube) that needs to be processed by the laser processing apparatus. The lines are drawn on a surface of the to-be-processed material. When the surface of the to-be-processed material having the drawn lines faces the camera, the camera captures the image of the to-be-processed material and the lines drawn on the to-be-processed material.

The image captured by the camera is used for depicting the to-be-processed material and the lines drawn on the to-be-processed material.

At block 130, processing lines of the to-be-processed material are identified according to the drawn lines in the captured image.

The lines drawn on the surface of the to-be-processed material are edge lines drawn on a laser product to be obtained. If there is a shake in the drawing process, the shake is shown in the drawn lines in the captured image. Therefore, according to the drawn lines in the image and a fuzzy recognition scheme, actual processing lines of the to-be-processed material can be determined.

At block 150, laser processing is performed on the to-be-processed material according to the processing lines, to obtain a laser product corresponding to the drawn lines.

The to-be-processed material is processed according to the processing lines. That is, the laser processing apparatus performs, according to the processing lines, laser processing (such as laser cutting, laser engraving, or the like) on the to-be-processed material. When the laser processing is completed, the to-be-processed material is processed into the laser product corresponding to the lines drawn on the to-be-processed material.

According to the above method, the laser processing apparatus can directly process the to-be-processed material according to the lines drawn by the user on the surface of the to-be-processed material, which greatly reduces manual operations required in the laser processing process, thereby solving the problem that various manual operations are required in the related art. In the implementation, the user merely needs to draw the lines on the to-be-processed object, put the to-be-processed object having the drawn lines into the laser processing apparatus, and then trigger the laser processing apparatus to execute the above method. Thereafter, the laser product corresponding to the drawn lines can be obtained.

In at least one implementation, the lines are drawn on the to-be-processed material according to a laser processing manner planned for the to-be-processed material. The operation at block 110 includes the following. The camera is controlled to perform image capturing against the to-be-processed material, to obtain the image of the to-be-processed material that contains the drawn lines.

In one example, the user can draw various lines on the to-be-processed material, such that the laser processing apparatus can perform corresponding laser processing on each kind of lines. For example, the laser processing apparatus can perform laser cutting on the red line and perform laser engraving on the black line.

Figure 2:
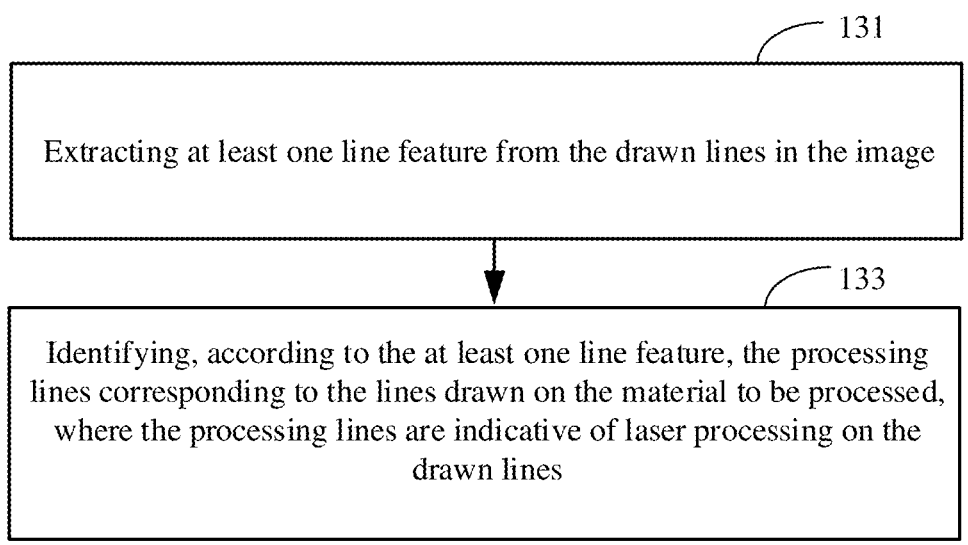
FIG. 2 is a flow chart illustrating an operation at block 130 in the method illustrated in FIG. 1.

FIG. 2 is a flow chart illustrating an operation at block 130 in the method illustrated in FIG. 1. In at least one implementation, as illustrated in FIG. 2, the operations at block 130 include operations at block 131 and 133.

At block 131, at least one line feature is extracted from the drawn lines in the image.

For example, the at least one line feature includes a line color.

At block 133, the processing lines corresponding to the lines drawn on the to-be-processed material are identified according to the at least one line feature, where the processing lines are indicative of laser processing on the drawn lines.

Different drawn lines are distinguished according to the at least one line feature. For example, drawn lines of different colors represent different drawn lines. For each kind of drawn lines in the image, a corresponding kind of standard processing lines are identified, and there is no shake in the processing lines. In addition, each kind of processing lines matches the corresponding kind of lines drawn on the to-be-processed material in terms of size.

Each kind of drawn lines are subjected to corresponding laser processing. That is, according to the processing lines, the to-be-processed material is processed by adopting a corresponding laser processing manner (such as laser cutting, laser engraving, or the like). In one example, a correspondence between laser processing manners and line types is preset in the laser processing apparatus. For example, the laser processing apparatus is preset to perform laser engraving on the black line.

Figure 3:
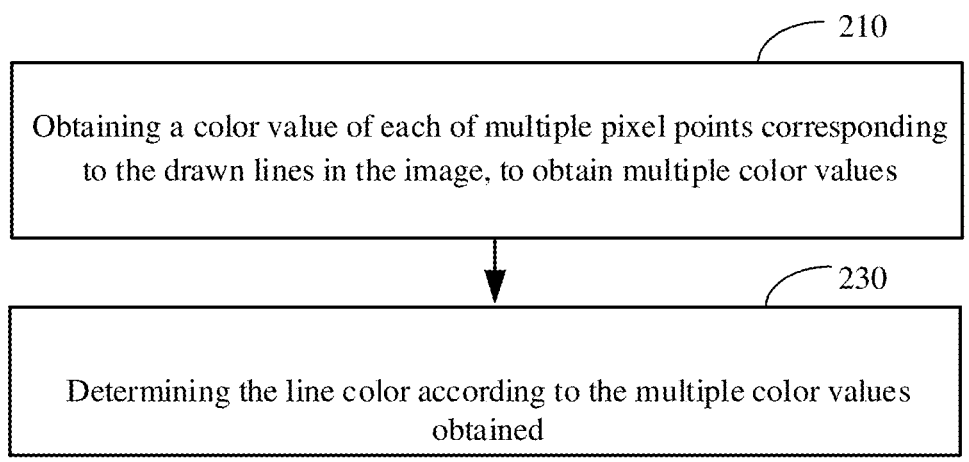
FIG. 3 is a flow chart illustrating an operation at block 131 in the method illustrated in FIG. 2.

FIG. 3 is a flow chart illustrating an operation at block 131 in the method illustrated in FIG. 2. In at least one implementation, as illustrated in FIG. 3, the operations at block 131 include operations at block 210 and 230.

At block 210, a color value of each of multiple pixel points corresponding to the drawn lines in the image is obtained to obtain multiple color values.

The image includes multiple pixel points, and part of the multiple pixel points in the image (the drawn lines in the image) correspond to the lines drawn by the user on the to-be-processed material.

At block 230, the line color is determined according to the multiple color values obtained.

As one example, an average value of the multiple color values obtained is calculated, and the line color is determined according to the average value. As another example, a distribution interval to which the multiple color values obtained belong is determined, and the line color is determined according to the distribution interval.

Figure 4:
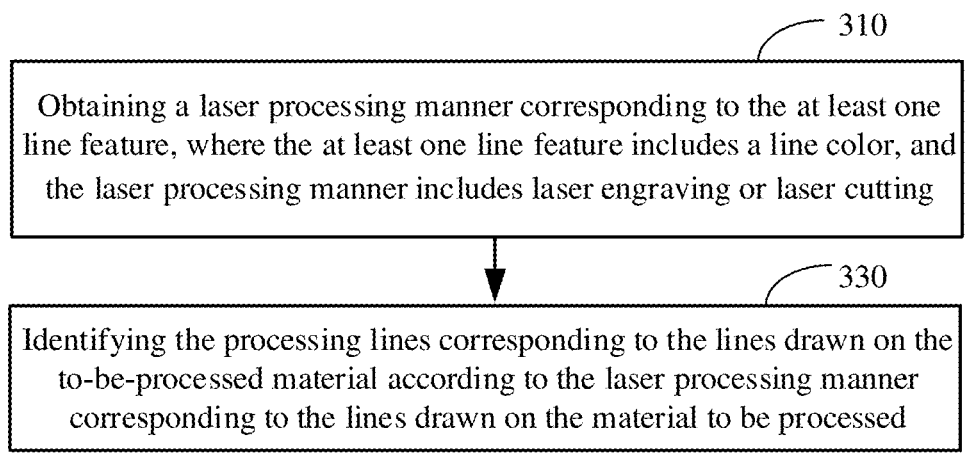
FIG. 4 is a flow chart illustrating an operation at block 133 in the method illustrated in FIG. 2.

FIG. 4 is a flow chart illustrating an operation at block 133 in the method illustrated in FIG. 2. In at least one implementation, as illustrated in FIG. 4, the operations at block 133 include operations at block 310 and 330.

At block 310, a laser processing manner corresponding to the at least one line feature is determined, where the at least one line feature includes the line color, and the laser processing manner includes laser engraving or laser cutting. For the manner of determining the line color, reference can be made to the description related to FIG. 3.

In one example, prior to the operation at block 310, a mapping relationship between line colors and laser processing manners is pre-established. For example, a laser processing manner corresponding to the red line is laser engraving, and a laser processing manner corresponding to the blue line is laser cutting.

At block 330, the processing lines corresponding to the lines drawn on the to-be-processed material are identified according to the laser processing manner corresponding to the lines drawn on the to-be-processed material.

The processing lines corresponding to the drawn lines are identified, and the identified processing lines are mapped to the laser processing manner corresponding to the drawn lines.

Figure 5:
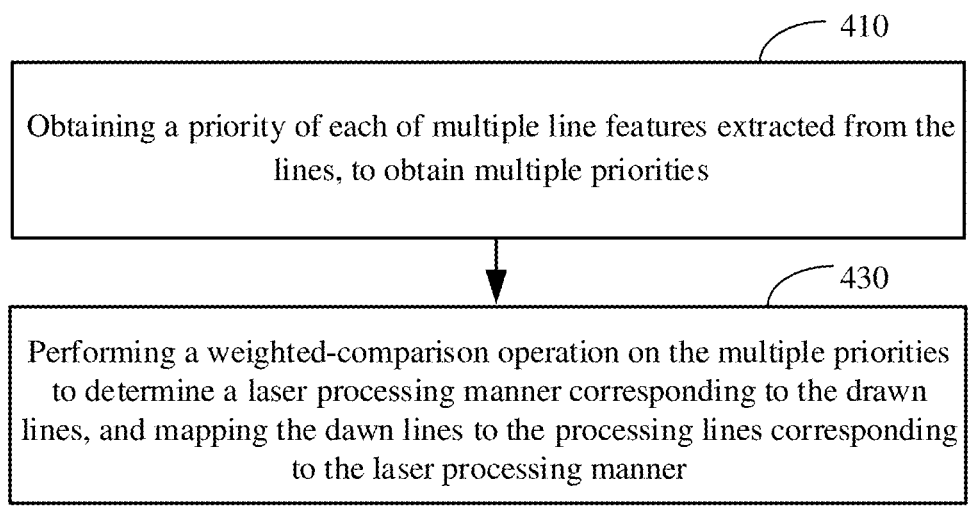
FIG. 5 is a flow chart illustrating an operation at block 133 in the method illustrated in FIG. 2.

FIG. 5 is a flow chart illustrating an operation at block 133 in the method illustrated in FIG. 2. In at least one implementation, the at least one line feature is embodied as multiple line features. As illustrated in FIG. 5, the operations at block 133 include operations at block 410 and 430.

At block 410, a priority of each of the multiple line features extracted from the drawn lines is obtained, to obtain multiple priorities.

In addition to the line color, the at least one line feature further includes the following: whether the line is a straight line, curved line, wavy line, dot-dash line, dashed line, or a hollow line, or whether the line is a thick line or a thin line. The priority of each of the above line features is determined according to actual needs.

In one example, the laser processing apparatus may misrecognize the line color of a line drawn on the to-be-processed material in condition of dim light or strong light. Therefore, line feature B (whether the drawn line is a straight line, curved line, wavy line, dot-dash line, dashed line, or a hollow line) may be set to have a higher priority than line feature A (line color). That is, if the laser processing manner corresponding to line feature A is different from that corresponding to line feature B, the laser processing manner corresponding to the drawn line is determined according to line feature B.

At block 430, a weighted-comparison operation is performed on the multiple priorities to determine a laser processing manner corresponding to the drawn lines, and the drawn lines are mapped to the processing lines corresponding to the laser processing manner.

In one example, the laser processing manner corresponding to a drawn line is determined according to line feature A (line color), line feature B (whether the drawn line is a straight line, curved line, wavy line, dot-dash line, dashed line, or a hollow line), and line feature C (whether the dawn line is a thick line or a thin line).

Line feature A is preset to have a higher priority than line feature C, and line feature B is preset to have a higher priority than line feature A. That is, a weight of line feature B is greater than that of line feature A, and the weight of line feature A is greater than that of line feature C.

For a drawn line, score A is determined according to line feature A, score B is determined according to line feature B, and score C is determined according to line feature C. Thereafter, a weighted sum of the score A, B, and C is calculated, and the laser processing manner corresponding to the drawn line is determined according to the weighted sum. In one example, for a drawn line, score (weight) A of line feature A, weight B of line feature B, and weight C of line feature C are pre-stored in the laser processing apparatus, and a correspondence between distribution intervals and laser processing manners is predetermined. Thereafter, the laser processing manner corresponding to the drawn line is determined as follows. A sum of the weight A, B, and C is calculated, a distribution interval to which the sum calculated of weight A, B, and C belongs is determined, and thus the laser processing manner corresponding to the drawn line is determined according to the distribution interval and the correspondence between the distribution intervals and the laser processing manners.

The following will describe device implementations of the disclosure, which can be used to implement the foregoing method implementations of the disclosure. For technical details not described, reference may be made to the method implementations.

Figure 6:
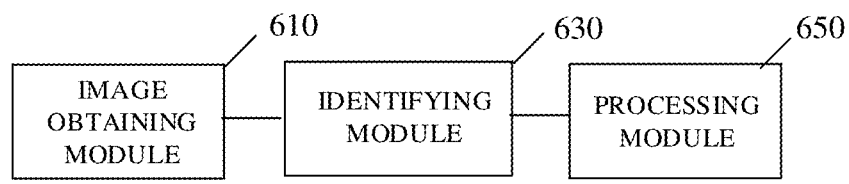
FIG. 6 is a block diagram illustrating a control device of laser processing according to implementations of the disclosure.

FIG. 6 is a block diagram illustrating a control device of laser processing according to implementations of the disclosure. As illustrated in FIG. 6, the control device of laser processing includes an image obtaining module 610, an identifying module 630, and a processing module 650. The image obtaining module 610 is configured to capture, via a camera mounted on a laser processing apparatus, an image of a to-be-processed material, where the captured image is used for depicting the to-be-processed material and lines drawn on the to-be-processed material. The identifying module 630 is configured to identify, according to the drawn lines in the captured image, processing lines of the to-be-processed material. The processing module 650 is configured to perform, according to the processing lines, laser processing on the to-be-processed material, to obtain a laser product corresponding to the drawn lines.

In one example, the lines are drawn on the to-be-processed material according to a laser processing manner planned for the to-be-processed material. The image obtaining module is configured to control the camera to perform image capturing against the to-be-processed material, to obtain the image of the to-be-processed material that contains the drawn lines.

In at least one implementation, the identifying module includes a feature extracting unit and a determining unit. The feature extracting unit is configured to extract at least one line feature from the drawn lines in the image. The determining unit is configured to identify, according to the at least one line feature, the processing lines corresponding to the lines drawn on the to-be-processed material, where the processing lines are indicative of laser processing on the drawn lines.

In one example, the at least one line feature includes a line color. The feature extracting unit is configured to obtain a color value of each of multiple pixel points corresponding to the drawn lines in the image, to obtain multiple color values, and determine the line color according to the multiple color values obtained.

In one example, the determining unit is configured to: obtain a laser processing manner corresponding to the line color, where the laser processing manner includes laser engraving or laser cutting; identify the processing lines corresponding to the lines drawn on the to-be-processed material according to the laser processing manner corresponding to the lines drawn on the to-be-processed material.

In one example, the at least one line feature is embodied as multiple line features. The determining unit is configured to: obtain a priority of each of the multiple line features extracted from the drawn lines, to obtain multiple priorities; perform a weighted-comparison operation on the multiple priorities to determine a laser processing manner corresponding to the drawn lines, and mapping the drawn lines to the processing lines corresponding to the laser processing manner.

A laser processing apparatus equipped with a camera is provided. The laser processing apparatus includes a processor and a memory storing computer readable instructions. The computer readable instructions, when executed by the processor, cause the processor to perform the method described in any implementation of the disclosure.

Figure 7:
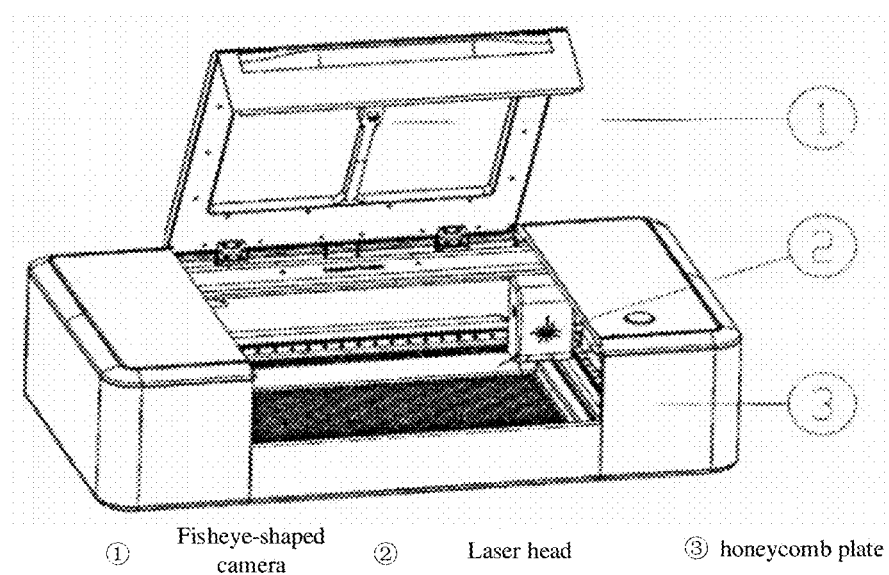
FIG. 7 is a schematic diagram illustrating a laser processing apparatus according to implementations of the disclosure.

FIG. 7 is a schematic diagram illustrating a laser processing apparatus according to implementations of the disclosure. As illustrated in FIG. 7, the laser processing apparatus includes an upper cover, and the upper cover is hinged with a host machine. The upper cover can be opened and closed. When the upper cover is opened, the to-be-processed material can be placed on a honeycomb plate.

The laser processing apparatus is provided with a start button. In case that the upper cover is closed, the laser processing apparatus can execute the above method when the start button is triggered by the user. The laser processing apparatus is equipped with a camera for obtaining an image of the to-be-processed material on the honeycomb plate.

Laser processing is performed on the to-be-processed material via a laser head mounted on the laser processing apparatus.

Implementations of the disclosure further provide a computer readable storage medium storing computer programs. The computer programs which, when executed by a processor, cause the processor to perform the method described in any implementation of the disclosure.

It should be understood that the disclosure is not limited to the precise structure that has been described above and illustrated in the accompanying drawings, and various modifications and changes can be performed without departing from its scope. The scope of the disclosure is only limited by the appended claims.

What is claimed is:

1. A control method of laser processing, comprising:
capturing, via a camera mounted on a laser processing apparatus, an image of a to-be-processed material, wherein the captured image is used for depicting the to-be-processed material and lines drawn on the to-be-processed material;
extracting at least one line feature from the drawn lines in the image, wherein the at least one line feature is embodied as a plurality of line features;
identifying, according to the at least one line feature, processing lines corresponding to the lines drawn on the to-be-processed material, wherein the processing lines are indicative of laser processing on the drawn lines; and
performing, according to the processing lines, laser processing on the to-be-processed material, to obtain a laser product corresponding to the drawn lines,
wherein the identifying, according to the at least one line feature, the processing lines corresponding to the lines drawn on the to-be-processed material comprises:
obtaining a priority of each of the plurality of line features extracted from the drawn lines, to obtain a plurality of priorities; and
determining a laser processing manner corresponding to the drawn lines according to the plurality of priorities.

2. The method of claim 1, wherein the lines are drawn on the to-be-processed material according to a laser processing manner planned for the to-be-processed material, wherein capturing, via the camera mounted on the laser processing apparatus, the image of the to-be-processed material comprises:
controlling the camera to perform image capturing against the to-be-processed material, to obtain the image of the to-be-processed material that contains the drawn lines.

3. The method of claim 1, wherein when the at least one line feature comprises a line color, the extracting the at least one line feature from the drawn lines in the image comprises:
obtaining a color value of each of a plurality of pixel points corresponding to the drawn lines in the image, to obtain a plurality of color values; and
determining the line color according to the plurality of color values obtained.

4. The method of claim 3, wherein the identifying, according to the at least one line feature, the processing lines corresponding to the lines drawn on the to-be-processed material comprises:
obtaining the laser processing manner corresponding to the line color, wherein the laser processing manner comprises laser engraving or laser cutting; and
identifying the processing lines corresponding to the lines drawn on the to-be-processed material according to the laser processing manner corresponding to the lines drawn on the to-be-processed material.

5. The method of claim 1, wherein when the at least one line feature comprises a line color, the identifying, according to the at least one line feature, the processing lines corresponding to the lines drawn on the to-be-processed material comprises:
obtaining the laser processing manner corresponding to the line color, wherein the laser processing manner comprises laser engraving or laser cutting; and
identifying the processing lines corresponding to the lines drawn on the to-be-processed material according to the laser processing manner corresponding to the lines drawn on the to-be-processed material.

6. The method of claim 1, further comprising:
after obtaining the priority of each of the plurality of line features extracted from the drawn lines, to obtain the plurality of priorities,
performing a weighted-comparison operation on the plurality of priorities.

7. A laser processing apparatus equipped with a camera, the laser processing apparatus comprising:
a processor; and
a non-transitory memory storing computer readable instructions which, when executed by the processor, cause the processor to:
capture, via a camera mounted on a laser processing apparatus, an image of a to-be-processed material, wherein the captured image is used for depicting the to-be-processed material and lines drawn on the to-be-processed material,
extract at least one line feature from the drawn lines in the image, wherein the at least one line feature is embodied as a plurality of line features;
identify, according to the at least one line feature, processing lines corresponding to the lines drawn on the to-be-processed material, wherein the processing lines are indicative of laser processing on the drawn lines; and
perform, according to the processing lines, laser processing on the to-be-processed material, to obtain a laser product corresponding to the drawn lines,
wherein the processor configured to identify, according to the at least one line feature, the processing lines corresponding to the lines drawn on the to-be-processed material is configured to:
obtain a priority of each of the plurality of line features extracted from the drawn lines, to obtain a plurality of priorities; and
determine a laser processing manner corresponding to the drawn lines according to the plurality of priorities.

8. The laser processing apparatus of claim 7, wherein the lines are drawn on the to-be-processed material according to a laser processing manner planned for the to-be-processed material, wherein the processor configured to capture, via the camera mounted on the laser processing apparatus, the image of the to-be-processed material is configured to:
control the camera to perform image capturing against the to-be-processed material, to obtain the image of the to-be-processed material that contains the drawn lines.

9. The laser processing apparatus of claim 7, wherein when the at least one line feature comprises a line color, the processor configured to extract the at least one line feature from the drawn lines in the image is configured to:

obtain a color value of each of a plurality of pixel points corresponding to the drawn lines in the image, to obtain a plurality of color values; and determine the line color according to the plurality of color values obtained.

10. The laser processing apparatus of claim 9, wherein the processor configured to identify, according to the at least one line feature, the processing lines corresponding to the lines drawn on the to-be-processed material is configured to:

obtain the laser processing manner corresponding to the line color, wherein the laser processing manner comprises laser engraving or laser cutting; and identify the processing lines corresponding to the lines drawn on the to-be-processed material according to the laser processing manner corresponding to the lines drawn on the to-be-processed material.

11. The laser processing apparatus of claim 7, wherein when the at least one line feature comprises a line color, the processor configured to identify, according to the at least one line feature, the processing lines corresponding to the lines drawn on the to-be-processed material is configured to:

obtain the laser processing manner corresponding to the line color, wherein the laser processing manner comprises laser engraving or laser cutting; and identify the processing lines corresponding to the lines drawn on the to-be-processed material according to the laser processing manner corresponding to the lines drawn on the to-be-processed material.

12. The laser processing apparatus of claim 7, wherein the processor is further configured to:

after obtaining the priority of each of the plurality of line features extracted from the drawn lines, to obtain the plurality of priorities, perform a weighted-comparison operation on the plurality of priorities.

13. A non-transitory computer readable storage medium, the computer readable storage medium storing computer programs which, when executed by a processor, cause the processor to:

capture, via a camera mounted on a laser processing apparatus, an image of a to-be-processed material, wherein the captured image is used for depicting the to-be-processed material and lines drawn on the to-be-processed material;

extract at least one line feature from the drawn lines in the image, wherein the at least one line feature is embodied as a plurality of line features;

identify, according to the at least one line feature, processing lines corresponding to the lines drawn on the to-be-processed material, wherein the processing lines are indicative of laser processing on the drawn lines; and perform, according to the processing lines, laser processing on the to-be-processed material, to obtain a laser product corresponding to the drawn lines, wherein the computer programs executed by the processor to identify, according to the at least one line feature, the processing lines corresponding to the lines drawn on the to-be-processed material are executed by the processor to:

obtain a priority of each of the plurality of line features extracted from the drawn lines, to obtain a plurality of priorities; and determine a laser processing manner corresponding to the drawn lines according to the plurality of priorities.

14. The non-transitory computer readable storage medium of claim 13, wherein the lines are drawn on the to-be-processed material according to a laser processing manner planned for the to-be-processed material, wherein the computer programs executed by the processor to capture, via the camera mounted on the laser processing apparatus, the image of the to-be-processed material are executed by the processor to:

control the camera to perform image capturing against the to-be-processed material, to obtain the image of the to-be-processed material that contains the drawn lines.

15. The non-transitory computer readable storage medium of claim 14, wherein the computer programs executed by the processor are further executed by the processor to:

after obtaining the priority of each of the plurality of line features extracted from the drawn lines, to obtain the plurality of priorities, perform a weighted-comparison operation on the plurality of priorities.

16. The non-transitory computer readable storage medium of claim 13, wherein when the at least one line feature comprises a line color, the computer programs executed by the processor to extract the at least one line feature from the drawn lines in the image are executed by the processor to:

obtain a color value of each of a plurality of pixel points corresponding to the drawn lines in the image, to obtain a plurality of color values; and determine the line color according to the plurality of color values obtained.

17. The non-transitory computer readable storage medium of claim 16, wherein the computer programs executed by the processor to identify, according to the at least one line feature, the processing lines corresponding to the lines drawn on the to-be-processed material are executed by the processor to:

obtain the laser processing manner corresponding to the line color, wherein the laser processing manner comprises laser engraving or laser cutting; and identify the processing lines corresponding to the lines drawn on the to-be-processed material according to the laser processing manner corresponding to the lines drawn on the to-be-processed material.

* * * * *